– Patented Apr. 26, 1966

3,247,593
SILICIOUS DENTAL FILLING
Joseph H. Schlesinger, New York, N.Y., assignor to Eagle Chemical Co., New York, N.Y.
No Drawing. Filed Mar. 29, 1963, Ser. No. 269,198
13 Claims. (Cl. 32—15)

This invention relates to dental cements and particularly to the product and method of use for such cements so as to give improved results.

Dental cement that is at present in extensive use is the silicate. The silicate used gives on setting a certain proportion of free acid, the acid being either developed during the setting or used in the compounding of the cement before application to the prepared tooth surface to be treated. Thus, a modified phosphoric acid is used as the medium for making the paste of silicate cement for filling tooth cavities. This acidity of the cement persists for a substantial period of time after the cavity is filled and is frequently the cause of very objectionable irritation and pain and subsequent destruction of the pulp. Furthermore, the cement is porous; as a result it allows ingress of saliva or other matter carried in with the liquid which results in slow solution of ingredients of the set cement to cause dimensional changes, and ultimate destruction to the tooth. Furthermore, the dental silicate cement does not set satisfactorily in the presence of water on the surface to which it is applied. On the other hand, if the surface to which it is applied is thoroughly dry then the acid of the cement is absorbed to an objectionable extent into that surface.

The present invention provides a composition and method for overcoming these and other disadvantages of the dental cements.

In a modification which constitutes the preferred embodiment of the invention, silicate ester is applied over the surface of the tooth cavity.

Several advantages are obtained by the composition described.

The silicate ester first applied over the surface of the tooth cavity reacts with moisture present to liberate the gelatinous silica (this term including silicic acid) over the cavity surface. This change involves hydrolysis of the silicate ester and in that change some water is combined with it and gelatinous silica is formed in the cavity. The prepared acid exuding cement filling is then inserted into the jel formed in the tooth cavity and is embedded therein, thereby being surrounded by the silica jel. After the jel hardens, it serves as an impervious intermediate layer between the acid exuding silicious cement filling and the cavity surface of the tooth. The acid exuded by the dental cement hastens this liberation of silica and makes the decomposition of the silicate ester practically complete and instantaneous. The moisture used up in the hydrolysis of the silicate ester prevents interference by that moisture originally present with the setting of the silicious cement filling. The silicate ester penetrates into the said silicious cement filling to complete the final hydrolysis of the last parts of the ester. As a result there is formed in the silicious cement filling a deposit of silica. This deposit decreases the porosity of the silicious cement filling after setting and also provides a matrix or binder within the cement.

When the additional silicate ester is applied over the exterior surface of the set silicious cement filling after its completion, penetration into the pores occurs from the exterior also giving additional bonding of the cement and sealing of the pores. The bonding agent of pure silica has many advantages. It is insoluble in water, it is acid proof without any chemical action upon the surrounding tissue and material, neutral in pH and has permanent transparency.

The bonding referred to increases the strength and flexibility of set cement. The decrease in the porosity accompanying the precipitation of the silica within the cement decreases the penetrability to liquids and therefore decreases the rate of solution of the silicious filling in long use. The decrease in porosity also minimizes ingress of liquid to the tooth structure and thereby increases the protection of the tooth.

In common practice silicious cement fillings are prepared by mixing a powdered mass containing kaolin or a kindred silicate with a suspending medium, preferably a solution of orthophosphoric or some other phosphoric acids to which oxides of aluminum or calcium have been added. The mixture when of proper plastic consistency, is pressed into the tooth cavity.

It is generally believed that the more powder is added to a mix the stronger the filling will be. Up to a point it is true. A thin mix does not produce a strong filling, as one of the proper consistency. Adding powder until the mix has putty-like stiffness does not produce a corresponding increase of strength.

The determining factor of strength of silicious cement filling depends upon the quantity of silica contained in the powder which is mixed with the acid liquid.

Since the cement powder contains a fixed amount of silica this amount cannot be altered when the mix is made. Therefore to increase the strength of the cement filling an additional amount of liquid silica ester is added and incorporated into the mix which turns into a gelatinous colloidal adhesive within the body of the cement thereby providing a matrix fixing a silica binder within the filling after drying. This leaves an ultimate tenacious silica bond of pure silica in the filling.

Thus, strength and toughness of the filling are increased; porosity, ingress of liquid and penetrability of liquid are decreased, thereby decreasing the rate of solution of the filling. Overall, an increase in the protection of the tooth over a long period of use is achieved.

The bonding agent of pure silica has many advantages. It is insoluble in water, it is acid proof without any chemical action upon the surrounding tissue and material, neutral in pH and has a permanent transparency.

The silicate esters used may be employed in substantially pure liquid form and are used in that condition for some purposes. However, they are preferably used in the form of a solution in an organic solvent as, for instance, one of the lower alcohols.

The action of the silicate esters in contact with the cavity surface of the tooth and also in contact with the silicious dental cement will be explained in greater detail by taking tetraethyl silicate for example.

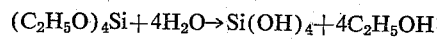

The orthosilicic acid is a gelatinous colloidal adhesive, which quickly forms in the tooth cavity. It gradually loses moisture as follows:

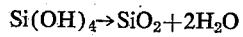

As it loses moisture it hardens. Consequently the application over a layer of the silicate of dental cement results in the production of a bond not obtainable in any other way.

For use in the coating of the tooth cavity or in coating a silicious tooth filling I use a silicate ester, one that must be a liquid at ordinary temperatures, is decomposed by water or acid with the production of colloidal silicic acid or silica and compatible with use in the mouth. Examples of silicate ester that meet these requirements and that illustrate the class of compounds that may be used are diethyl silicate, tetraethyl silicate and dimethyl silicate.

To prevent premature hydrolization of ethyl silicate before using it, I use a form of anhydrous alcohol, ethyl alcohol preferred.

The matter of obtaining the proper consistency for the silicious cement has received substantial attention in clinics and has been treated in Journals in many learned and prolific articles.

It is well-known that atmospheric conditions, temperatures and humidity have a great influence on the behavior of the components used in the composition of the cement. This also includes the acid used when the cement is mixed for obtaining the proper consistency for the drilling because phosphorus acids generally are hygroscopic. When a proper consistency is obtained the plastic mix is pressed into the tooth cavity where the cement is to commence to set, but not before it is placed into the tooth cavity.

As stated above there are many factors involved which influence the changes in the chemistry of the cement in obtaining the proper consistency while the mix is being made.

There is no way of knowing in advance by the operator how the ingredients of this cement will perform in the mix before the mix is completed. Then it may be too late. For example when the setting of the cement commences before the mix is completed there is no way of retarding reaction. The mix must be discarded. There is only one thing positive in such an act and that is the cement is mixed and reacts sooner than anticipated despite the directions which accompany the ingredients of the cement.

To overcome the drawbacks of mixing the cement on glass slab when the liquid ethyl silicate, or other silicate ester, is added to the mix a moderation of the reaction is achieved. The added liquid silicate ester adds pure silica to the cement and forms a jel in the presence of the acidic mix automatically. Thereby the setting of the cement is retarded and the mix remains in an unset condition longer by retarding the reaction between the clay and the phosphoric acid. Additional powder can be added to the mix until the proper consistency for the filling is attained. In the meanwhile the operator obtains ample time to work with an unsetting cement for introducing the filling into the tooth cavity and for its completion in the cavity. Hence, the cement remains in an unsetting condition caused by extending the mixing time by the addition of the liquid silicate. Ultimately the cement commences to set and hardens in the cavity by virtue of its contact with the acidic cement.

Before the acid exuding cement filling is placed into the tooth cavity, the surface of the cavity is coated with a silicate ester and a gelatinous silica "jel" is formed in the cavity, wherein the acid exuding silicate filling is embedded, thereby being surrounded by the silica jel. After the jel hardens it serves as an impervious acid resisting intermediate layer between the acid exuding silicious cement filling and the cavity surface of the tooth, thus automatically inhibiting pulp irritation caused by the acid exuding filling.

It will be understood also that it is intended to cover all changes and modifications of the example of the invention herein chosen for the purpose of illustration which do not constitute departures from the spirit and scope of the invention.

These are the long desired first revolutionary novel improvements in silicious dental cement fillings, since their first appearance in dentistry over forty-five years ago.

What is claimed is:

1. In the process of inserting acidic silicious dental cement consisting essentially of a clay powder and phosphoric acid into a tooth cavity to form a dental porcelain filling, the method which comprises applying a lower alkyl liquid silicate ester over the entire prepared surface of said tooth cavity, inserting said dental cement into the said prepared cavity and causing the cement to set.

2. The method in accordance with claim 1 which comprises applying a lower alkyl silicate ester over the exposed portion of the silicious dental cement filling after setting of the said dental cement.

3. The method of claim 1 wherein anhydrous ethyl alcohol and ethyl silicate is used.

4. In the process of filling a tooth cavity with a silicious dental cement filling as described in claim 1, the method of controlling setting time of the said dental cement which comprises incorporating into the mix of the dental cement a small amount of liquid silicate ester, thereby retarding the setting time of said dental cement, whereby mixing of the dental cement can be continued longer until proper consistency for filling is attained.

5. The method in accordance with claim 1, which comprises applying a lower alkyl silicate ester over the exposed portion of the inserted silicious dental cement in the tooth cavity, while the cement is in a plastic state in said cavity.

6. In the method of inserting an acidic silicious dental cement filling, consisting essentially of clay powder and phosphoric acid, into a prepared tooth cavity in the mouth of a patient, to form a dental porcelain filling; the improvement comprising, coating the surface of the cavity wall with ethyl silicate to produce a silica jel; incorporating into the cement mix a silicate ester, thereby providing insoluble adhesive and flexible silica bonding agent for the finely divided particles in the filling; inserting the mixed cement containing the silica ester into the cavity; making an application of ethyl silicate over the inserted filling in the cavity, while the cement is in a plastic state in the cavity; and after the filling has hardened making another application of silicate ester over the hardened filling; whereby the incorporated ethyl silicate in the enumerated steps increases the content of the silica in the filling, an adhesive hard flexible insoluble silica glue is produced, serving as a matrix and as a shock absorbing agent in the filling, whereby brittleness and disintegration of the silica dental filling are restrained.

7. In the process of inserting an acid exuding silica dental cement filling into a tooth cavity by which acid penetration to the tooth is restrained, the improvement which comprises, applying ethyl silicate over the surface of the wall of the tooth cavity, whereby a silica jel layer is produced and upon the insertion and contact with the acidic silica dental cement the silica jel hardens, thus forming an impervious insoluble hard silica wall around the acid exuding silica dental cement filling, thereby inhibiting acid penetration and injury to the pulp in the tooth.

8. The method of filling a tooth cavity with silica dental cement which comprises applying liquid ethyl silicate ester over the prepared cavity, thereby to form a silica jel layer; inserting the acidic cement in the cavity thereby to form a hard silica wall around the inserted silica filling, which silica serves as an impervious silica binder, thereby increasing the strength of the filling and decreasing ingress of liquid into the filling, hence increasing protection of the tooth over a long period of use.

9. In the method of filling a tooth cavity with silica dental cement, the improvement comprising adding liquid silica ester within the cement mix wherein it serves as filler in the filling, decreasing the porosity in the filling and forms an insoluble silica binder for the finely divided particles in the filling, restraining disintegration of the filling.

10. In the formation of a hardened silica dental filling in a tooth cavity in the mouth of a patient the improvement which comprises applying silicate ester over the filling, whereby the silicate ester penetrates the filling, forming a silica binder in the filling, an abrasion resisting surface, restraining ingress of liquid into the filling and increases the strength of the filling.

11. In the process of inserting acidic silicious dental cement consisting essentially of clay powder and phosphoric acid into a prepared tooth cavity in the mouth of a patient, to form a dental porcelain filling, the improvement which comprises applying lower alkyl liquid silicate ester over the inserted cement filling while the cement is in a plastic state in said cavity, whereby after the filling hardens an abrasion resisting surface is produced.

12. In the process of inserting acidic silicious dental cement consisting essentially of clay powder and phosphoric acid into a prepared tooth cavity in the mouth of a patient to produce a silicious dental cement filling, the improved method comprising applying lower alkyl liquid silicate ester over the hardened cement filling, thereby penetrating the filling to form a silica binder within the filling and produce an abrasion resistant surface of increased strength.

13. In the process of filling a tooth cavity with acidic silicious dental cement in the mouth of a patient, the improvement comprising adding liquid ethyl silicate ester to the acidic cement mix, whereby the added liquid silicate ester reduces the acidity of the silicious dental filling, thereby pulp irritation and pain and subsequent destruction of the pulp is reduced by virtue of the reduced acidity produced in the silicious dental filling from the addition of the liquid ethyl silicate to the cement.

References Cited by the Examiner

UNITED STATES PATENTS

| | | | |
|---|---|---|---|
| Re. 21,779 | 4/1941 | Schlesinger | 32—15 |
| 1,450,467 | 4/1923 | Weyland | 106—35 |
| 2,063,667 | 12/1936 | Farkas et al. | 32—15 |
| 2,131,940 | 10/1938 | Erdle | 106—35 |
| 2,729,569 | 1/1956 | Lipkind | 106—35 |
| 2,732,600 | 1/1956 | Hanink et al. | 22—165 |
| | | | (106—38.35 XR) |
| 2,802,268 | 8/1957 | Knappwost | 32—15 |
| 2,842,445 | 7/1958 | Emblem et al. | 106—38.35 |
| 3,028,247 | 4/1962 | Molnar | 106—35 |
| 3,082,526 | 3/1963 | Nitzsche et al. | 32—15 |

FOREIGN PATENTS

| | | |
|---|---|---|
| 168,659 | 9/1921 | Great Britain. |
| 418,160 | 10/1934 | Great Britain. |

ALEXANDER H. BRODMERKEL, *Primary Examiner.*

MORRIS LIEBMAN, *Examiner.*